United States Patent
Bendahan et al.

(10) Patent No.: US 11,722,892 B2
(45) Date of Patent: Aug. 8, 2023

(54) VLC IN STREETS

(71) Applicant: AISIN CORPORATION, Kariya (JP)

(72) Inventors: Remy Bendahan, Sophia Antipolis (FR); Sylvain Bougnoux, Sophia Antipolis (FR); Yuta Nakano, Sophia Antipolis (FR); Takeshi Fujita, Kariya (JP)

(73) Assignee: AISIN CORPORATION, Kariya (JP)

( * ) Notice: Subject to any disclaimer, the term of this patent is extended or adjusted under 35 U.S.C. 154(b) by 102 days.

(21) Appl. No.: 17/189,885

(22) Filed: Mar. 2, 2021

(65) Prior Publication Data

US 2021/0400476 A1 Dec. 23, 2021

(30) Foreign Application Priority Data

Jun. 23, 2020 (EP) ..................................... 20315312

(51) Int. Cl.
| | |
|---|---|
| *H04B 10/116* | (2013.01) |
| *H04W 12/06* | (2021.01) |
| *H04W 12/108* | (2021.01) |
| *H04W 12/65* | (2021.01) |
| *H04B 10/524* | (2013.01) |

(52) U.S. Cl.
CPC .......... *H04W 12/06* (2013.01); *H04B 10/116* (2013.01); *H04B 10/524* (2013.01); *H04W 12/108* (2021.01); *H04W 12/65* (2021.01)

(58) Field of Classification Search
None
See application file for complete search history.

(56) References Cited

U.S. PATENT DOCUMENTS

| | | | | |
|---|---|---|---|---|
| 5,526,161 A * | 6/1996 | Suzuki | ............... | H04B 10/1143 |
| | | | | 398/118 |
| 8,208,818 B2 * | 6/2012 | Sasai | ...................... | H04B 1/707 |
| | | | | 398/189 |
| 9,900,092 B2 * | 2/2018 | De Bruijn | ............ | H04B 10/116 |
| 10,523,907 B2 * | 12/2019 | Shatz | ...................... | H04B 10/50 |
| 10,567,079 B1 * | 2/2020 | Inskeep | ................. | H03M 13/09 |
| 10,700,782 B2 * | 6/2020 | Brady | ..................... | B60Q 1/444 |
| 10,870,430 B2 * | 12/2020 | Relihan | ................ | G08G 1/0133 |
| 11,442,195 B2 * | 9/2022 | Kare | ....................... | H02J 50/30 |
| 2002/0131121 A1 * | 9/2002 | Jeganathan | ........ | H04B 10/1127 |
| | | | | 398/118 |
| 2004/0141753 A1 * | 7/2004 | Andreu-von Euw | ........................ | |
| | | | | H04B 10/1127 |
| | | | | 398/122 |
| 2008/0317473 A1 * | 12/2008 | Kunie | ................ | H04B 10/1149 |
| | | | | 398/128 |

(Continued)

FOREIGN PATENT DOCUMENTS

WO 2019/005051 A1 1/2019

*Primary Examiner* — Jai M Lee
(74) *Attorney, Agent, or Firm* — Sughrue Mion, PLLC

(57) ABSTRACT

A visual light communication emitter for a vehicle, arranged to communicate a status of the vehicle, includes a first light emitter arranged to emit flash light which is modulated at a first target frequency in a dedicated non-visible spectrum, and a second light emitter arranged to emit flash light which is modulated at a second target frequency in the dedicated non-visible spectrum. A difference between the first target frequency and the second target frequency is predetermined, so as to authenticate the status of the vehicle.

13 Claims, 4 Drawing Sheets

(56) References Cited

U.S. PATENT DOCUMENTS

| | | | |
|---|---|---|---|
| 2011/0129228 A1* | 6/2011 | McFadden | H04B 10/1141 |
| | | | 398/118 |
| 2012/0230703 A1 | 9/2012 | Yamada et al. | |
| 2014/0093234 A1 | 4/2014 | Roberts et al. | |
| 2014/0270799 A1* | 9/2014 | Roberts | H04B 10/116 |
| | | | 398/130 |
| 2016/0269112 A1* | 9/2016 | Guo | H05B 47/10 |
| 2017/0148310 A1* | 5/2017 | De Bruijn | H04N 23/45 |
| 2020/0062175 A1* | 2/2020 | Lee | B60Q 1/52 |
| 2021/0033747 A1* | 2/2021 | Kare | G01S 17/06 |
| 2021/0377711 A1* | 12/2021 | Sugimoto | H04W 4/48 |
| 2021/0399802 A1* | 12/2021 | Bendahan | G08B 21/18 |
| 2022/0166506 A1* | 5/2022 | Carraro | H04B 10/1143 |
| 2022/0166521 A1* | 5/2022 | Jang | H04L 27/0008 |
| 2022/0200701 A1* | 6/2022 | Hardin | G08G 1/0116 |
| 2022/0209865 A1* | 6/2022 | Barnett | H04B 10/1149 |

* cited by examiner

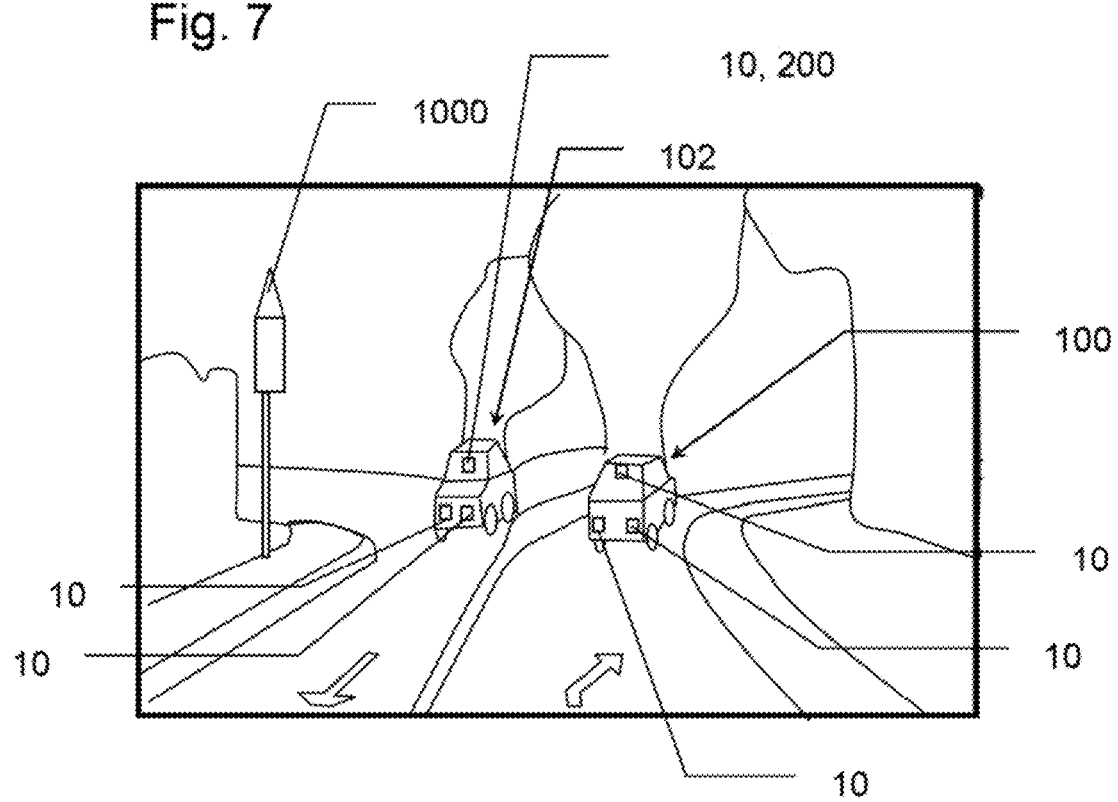

VLC IN STREETS

CROSS REFERENCE TO RELATED APPLICATIONS

This application is based on and claims priority under 35 U.S.C. § 119 to European Patent Application 20315312.7, filed on Jun. 23, 2020, the entire content of which is incorporated herein by reference.

TECHNICAL FIELD

This disclosure generally relates to visual light communication, in particular for communication between cars or between a mobile device such as a car and a fixed device such as a fixed installation in a street.

BACKGROUND DISCUSSION

Visual light communication (VLC) devices have been of great interest since few years. Visual Light communication is considered as an alternative to radio frequency (RF) communication.

Visual Light communication can occur between fixed or moving emitters and receivers. Typical emitters may include a single LED or an array of LEDs.

Some communication devices are known in the prior art.

For example, the prior art document WO2019005051 relates to a camera communication system using high speed camera sensors.

Further, the prior art document US2012/0230703 relates to a visible light communication receiver, a visible light communication system, and a visible light communication method.

The prior art document US2014/0093234 A1 relates to methods and apparatus for multiphase sampling of modulated light.

The prior art document of Sayf ALBAYATI, published in the International Journal of Computer Science and Mobile Computing, Vol. 8 Issue 6, June-2019, pg. 51-56 relates to an overview of visible light communication systems.

However, the prior art documents have the following drawbacks.

Since the communication media is the light, the environment in which the visual light communications are operated may include light noise that interferes with the light messages and reduce the reliability of messaging. Light noise may appear from different reasons e.g. scattered light, multiple reflections, ambient light such as neon lights of shops in the street, turn signals of vehicles, siren lamps of police cars, sun light etc.

Further, optical filters are typically used to reduce the light noise but they limit the type of light source for which communication can be done. For example, if the environment in which visual light communication has occur contains blue lights, then prior art highly recommends to choose a light emission in a different colour band or filter out the blue components of light emitter, otherwise communication may not be reliable. An optical filter ensure that only a certain light wavelength can be reliably communicated.

In the domain of automotive, regulations also limit the visual light communication. For example, rules for eye safety, or rules that a vehicle cannot emit visible light other than using the available devices—headlamps, tail lamps, turn light, brake and reverse lights. In the automotive domain, emitting non standardized light is not permitted especially for moving devices.

Communication range is limited due to the line of sight requirement and due to the ambient noise, which becomes hard to separate from message data as the range increase. It is currently limited to below 30 m in driving conditions.

It is sometimes important to understand the distance between emitter and receiver especially when emitter or receiver are moving (or both). For example, the distance information can be used to control a vehicle by slowing down and stop at a given distance (x meters) if a traffic light is about to become red. Despite that each fixed emitter can transmit its GPS coordinates (geolocalization), it is not guaranteed that the mobile receiver can retrieve its own GPS coordinate with an accuracy high enough to compute accurately distance (few cm error) between receiver to emitter. GPS information may not be sensed or with poor accuracy such as when a vehicle is driving in cities with sky scrapers. Prior art visual light communication devices do not allow distance computation between them. Further, a camera or a 3D sensor may be able to compute a distance. However, such devices have low capacities, in particular during night, or low luminosity (e.g. twilight) or high luminosity (dazzle), or if the object is too thin to be detected.

Light interferences between visual light communication devices may also reduce the reliability of visual light communication. Message broadcasting is indeed limited due to the necessity to separate the sources of the different messages.

A need thus exists for visual light communication which is not susceptible to the drawback mentioned above.

SUMMARY

According to an aspect of this disclosure, a visual light communication emitter for a vehicle, arranged to communicate a status of the vehicle, includes a first light emitter arranged to emit flash light which is modulated at a first target frequency in a dedicated non-visible spectrum, and a second light emitter arranged to emit flash light which is modulated at a second target frequency in the dedicated non-visible spectrum. A difference between the first target frequency and the second target frequency is predetermined, so as to authenticate the status of the vehicle.

According to another aspect of this disclosure, a visual light communication receiver includes an event camera arranged to detect flash light, and a control unit arranged to recognize the predetermined difference between the first target frequency and the second target frequency.

According to a further aspect of this disclosure, a vehicle includes one of a visual light communication emitter and a visual light communication receiver, and a vehicle control unit, the visual light communication emitter being arranged to communicate a status of the vehicle and including a first light emitter arranged to emit flash light which is modulated at a first target frequency in a dedicated non-visible spectrum, and a second light emitter arranged to emit flash light which is modulated at a second target frequency in the dedicated non-visible spectrum. A difference between the first target frequency and the second target frequency is predetermined, so as to authenticate the status of the vehicle. The visual light communication receiver includes an event camera arranged to detect flash light, and a control unit arranged to recognize the predetermined difference between the first target frequency and the second target frequency.

BRIEF DESCRIPTION OF THE DRAWINGS

The foregoing and additional features and characteristics of this disclosure will become more apparent from the following detailed description considered with the reference to the accompanying drawings, wherein:

FIG. 7 represents a vehicle according to the embodiment in a street equipped with a traffic light having the visual light communication emitter and the visual light communication receiver according to the embodiment.

DETAILED DESCRIPTION

Figure 1:
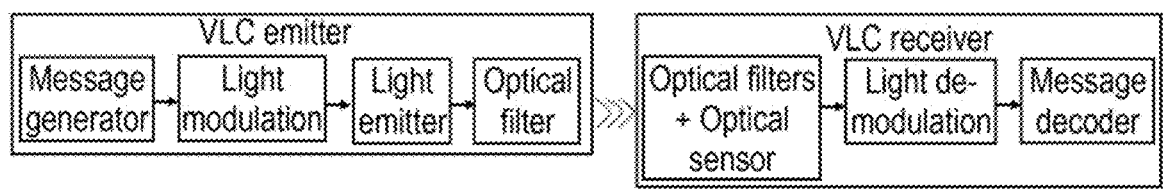
FIG. 1 represents a visual light communication emitter and receiver according to the prior art.

FIG. 1 represents a visual light communication emitter and receiver according to the prior art. In the prior art, the visual light communication (VLC) emitter comprises a message generator, a light modulation module, a light emitter and an optical filter. The message generator is able to send information to the light modulation which send a signal to the light emitter to emit light at a given wavelength corresponding to a given color in the visible spectrum between 400 THz and 770 THz (i.e. 400 to 700 10^12 Hz). The optical filter changes the wavelength of the light emitter so that the emitted color is changed.

The visual light communication receiver according to the prior art comprises optical filters along with an optical sensor in order to detect the light emitted by the visual light communication emitter according to the prior art. The visual light communication receiver further comprises a light demodulation module and a message decoder, in order to transcript the message initially generated by the message generator of the visual light communication emitter.

Figure 2:
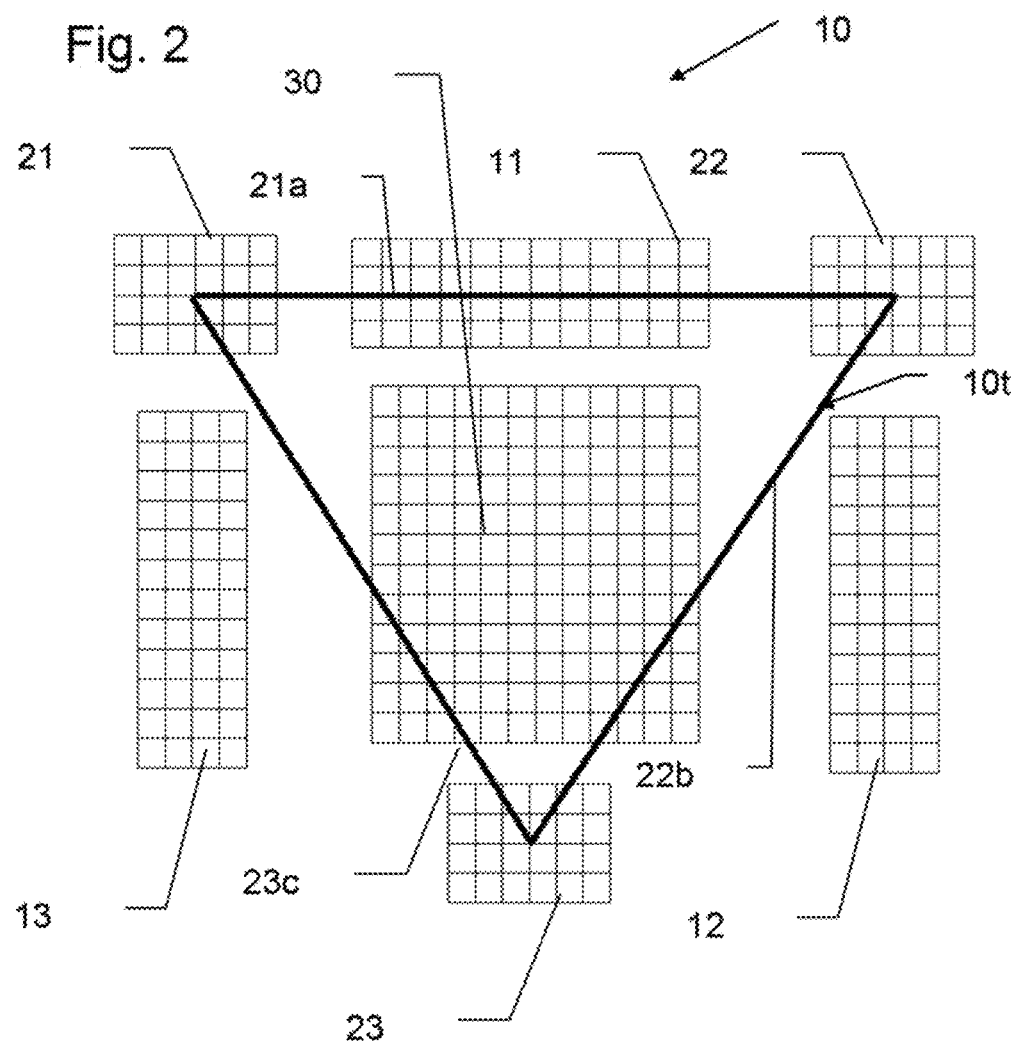
FIG. 2 represents a visual light communication emitter according to the embodiment.

FIG. 2 represents a visual light communication emitter 10 according to the present invention.

The visual light communication emitter 10 comprises a first light emitter 11-13 having a set of LED group (light-emitting diode). The set of LED group comprises a first group of LEDs 11 having four arrays of twelve individual LED, a second group of LEDs 12 with the same number of individual LED and a third group of LEDs 13 with the same number of individual LED. Of course, the number of LEDs in each group is an example of the number of LED, and could be adapted to other size of visual light communication emitter 10. The first light emitter 11-13 emits at a given wavelength which is preferably in the visible spectrum (such as white color, red color, blue color, red color or yellow color, or any combination thereof) and/or in the near infrared. Further, the light from the first light emitter 11-13 is modulated so that the first light emitter emits flash light at a first target frequency f1 which is in the non-visible spectrum. In other words, the light from the first light emitter 11-13 is modulated at the first target frequency f1, which is a successive state of ON state-OFF state-ON state-OFF state etc (that it to say: flashing or blinking) so that the first light emitter 11-13 emits flash light at the first target frequency f1.

The first target frequency f1 could be reformulated as the number of ON states during one second.

LEDs allow ultra-fast switching between ON-OFF lighting states (flashing) which in turn allows to encode messages.

In case of array or plurality of LEDs in a same group or in different groups, all LEDs may emit the same message (to ensure high reliability) or each LED may emit parts of the message to allow higher data transmission rate via parallel transmission.

The first target frequency f1 is preferably selected in the range of 1 kHz to 1 MHz, more preferably 1 kHz to 0.9 MHz, and even more preferably 1 kHz to 500 kHz.

Indeed, it has been observed that there no (or very few) natural events in said ranges in the nature due to natural phenomenon (natural light source). Thereby, the visual light communication and in particular the detection with a visual light communication receiver having a detector (in particular an event camera detector) is very accurate and does not suffer from noise.

That is, to avoid interference due to light noise, the light emitter flashes at a frequency not existing in typical condition of usage. It has been experimentally determined that during driving, the events recorded by an event camera never exceed a frequency of 1 kHz. It means that there is no emitting light source (natural and/or artificial such as buildings, shops, traffic lights) encountered during driving that emits at a frequency between 1 kHz and 1 MHz (which is the upper limit of time resolution of event cameras). The event camera can sample event up to 1 000 000 events/s.

Therefore, it is preferred to set the visual light communication flashing frequency above 1 kHz and below 1 MHz. It is considered that the various sources of light noise are drastically reduced at this flashing/target frequency.

The visual light communication emitter 10 further comprises a second light emitter 21-23 having a set of LED group (light-emitting diode). The set of LED group comprises a first group of LEDs 21 having four arrays of six individual LED, a second group of LEDs 22 with the same number of individual LED and a third group of LEDs 23 with the same number of individual LED. Of course, the number of LEDs in each group is an example of the number of LED, and could be adapted to other size of visual light communication emitter 10. The second light emitter 21-23 emits at a given wavelength which is preferably in the visible spectrum (such as white color, red color, blue color, red color or yellow color or any combination thereof) and/or in the near infrared. Further, the light from the second light emitter 21-23 is modulated so that the second light emitter emits flash light at a second target frequency f2 which is in the non-visible spectrum. In other words, the light from the second light emitter 21-23 is modulated at the second target frequency f2, which is a successive state of ON state-OFF state-ON state-OFF state etc. so that the second light emitter 22-23 emits flash light at the second target frequency f2. The first target frequency f2 could be reformulated as the number of ON states during one second.

The difference between the first target frequency f1 and the second target frequency f2 is predetermined. Said difference is preferably set a 0.3 kHz or 0.5 kHz. The difference may be preferably selected in the range of 0.01 kHz to 1 kHz, preferably 0.1 kHz to 0.5 kHz. The difference may also be selected in the range of 1 kHz to 100 kHz. This increase the reliability of the visual light communication system comprising the visual light communication emitter and the visual light receiver. Indeed, as mentioned above, there is no natural phenomenon in the selected range of flash light from the first light emitter 11-13 and the second light emitter 21-23, and there is no natural phenomenon having said predetermined difference in said selected range of frequency.

The first group of LEDs 21 of the second light emitter 21-23 is placed for example in the top left corner, the second group of LEDs 22 of the second light emitter 21-23 is placed on the top right corner and the third group of LEDs 23 of the second light emitter 21-23 is placed in the middle bottom. In other words, the second light emitter 21-23 comprises three emitting portions being the three groups of LEDs 21-23, each emitting portion being distant from each other by predetermined distance, so as to form a lamp triangle 10t having a predetermined dimension. The dimension of the lamp triangle 10t are the distance 21a between the first group of LEDs 21 and the first group of LEDs 22, the distance 22b between the second group of LEDs 22 and the third group of LEDs 23, and the distance 23c between the third group of LEDs 23 and the first group of LEDs 21. The lamp triangle 10t could be an equilateral triangle for with the distance between corner are the same, or any type of triangle.

It has to be noted that the human eye is not able to distinguish changes of light such as successive ON states-OFF states above the frequency of 100 Hz, due to retinal persistence (persistence of vision). It allows to comply with automotive requirement, in particular in term of safety and safety of driving.

The visual light communication emitter 10 further comprises a third light emitter 30. In the similar manner as discussed above, the third light emitter 30 emits flash light at a third target frequency f3 which is in the non-visible spectrum.

The third target frequency f3 is preferably selected in the range of 1 kHz to 1 MHz, more preferably 1 kHz to 0.9 MHz, and even more preferably 1 kHz to 500 kHz. The third target frequency f3 is 5 or 6 kHz in a preferred example, in order to facilitate distinction with the first target frequency f1 and the second target frequency f2, and to increase the reliability of the communication as discussed above. There is no event due to a natural light source in the range selected for the third target frequency.

The third light emitter 30 is preferably placed at least partly inside the lamp triangle 10t, in order to facilitate localization of the lamp triangle 10t.

The group of LEDs of the first light emitter 11-13 is preferably placed on each side of the lamp triangle 10t, so as to facilitate localization of the lamp triangle 10t.

In a preferred embodiment, the first light emitter 11-13 communicates the type of equipment on which it is installed (e.g. a vehicle, which type of vehicle such as moto, car, truck, train, tramway, bicycle, or a traffic light installed in a street, or generally any type of device in which the emitter is installed such as a smartphone or a helmet of a bicker). The second light emitter 21-23 communicates and illuminates the lamp triangle 10t so that it is clearly detectable by a visual light communication receiver 200. The third light emitter 30 communicates messages, such as the size of the lamp triangle 10t, so that the visual light communication receiver 200 can deduct from the observed size of the lamp triangle 10t the actual or measured distance between the visual light communication receiver 200 and the visual light communication emitter 10. The messages could be e.g. "my car located at this Latitude-Longitude will open in 1 second its front left door", the unique ID of the emitter, the dimensions of the segments separating the 3 points above-mentioned, etc.

In a preferred embodiment, the distance is computed according to the so-called Perspective-n-Point, so as to estimate the pose of a calibrated camera according to a set of n 3D points and their corresponding 2D projections in the image. The camera pose consists of six degrees-of-freedom: three rotation (roll, pitch, and yaw) and three translation. The one skilled in the art know such so-called Perspective-n-point and in particular for example applications with n=3 and n=2. Example of such is explained by the "P3P and P2P Problems with known camera and object vertical directions" published by Luigi D'Alfonso, Emanuele Garone, Pietro Muraca, Paolo Pugliese and gprix.it. In addition, such Perspective-n-point methodology are known from https://en.wikipedia.org/wiki/Perspective-n-Point and http://user-s.umiacs.umd.edu/~ramani/cmsc426/Lecture23_3Dpose.pdf.

The distance can be inferred using the 3 points method providing that camera internal parameters are known in advance.

Figure 3:
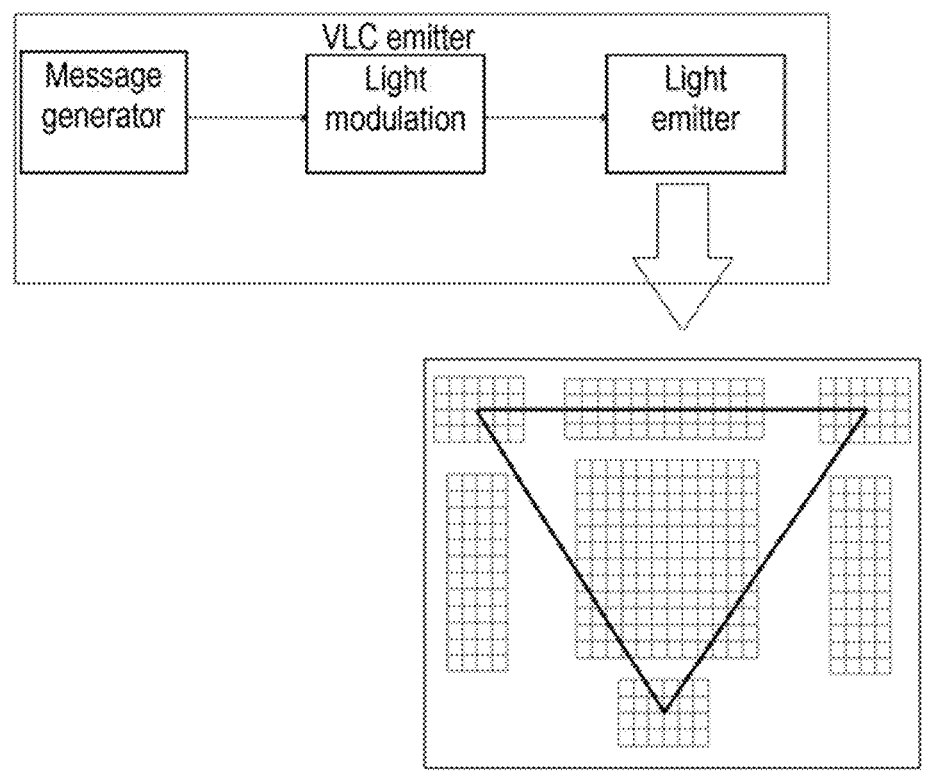
FIG. 3 represents the visual light communication emitter according to the embodiment having a message generator and a light modulation module.

FIG. 3 represents the visual light communication emitter according to the present invention having a message generator and a light modulation module.

The visual light communication emitter further comprises a message generator to generate a message, a light modulation module to modulate the flash light emitted by the light emitter, being the visual light communication emitter 10 illustrated in FIG. 2.

Figure 4:
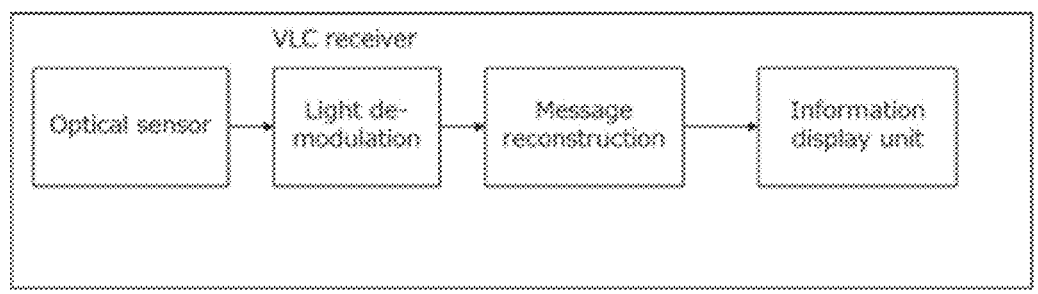
FIG. 4 represents a visual light communication receiver according to the embodiment.

FIG. 4 represents the visual light communication receiver according to the present invention.

The visual light communication receiver 200 comprises an optical sensor in order to detect light, a light de-modulation module in order to retrieve modulation of light, a message reconstruction in order to reconstruct a message and an information display unit 300 in order to display information.

The optical sensor is preferably an event camera, which detects the changes on pixels of a detected image (e.g. count of transition detection).

Among the most suitable optical sensors are the cameras since they are able to sense light emission in a wide field of view allowing to sense messages coming from one or multiple VLC emitters. Neuromorphic cameras such as event cameras are particularly well suited for handling high speed visible light communication. This kind of sensor generates spikes (events) when it observes a change in the intensity for each pixel. Unlike frame in conventional cameras, this mechanism gives event cameras many advantages such as a high temporal resolution, which could achieve 1Mframe/s, high dynamic range (>120 dB), high spatial resolution (1280×720), could be fitted with any optical lens allowing high directivity and most of all no redundancy in the data which is directly linked with low energy consumption of visual light communication signal decoding algorithms. Thus, event camera become a perfect fit for sensing light changes caused by high speed modulated LED light. This allows to treat signal as soon as it arrives (fast response) and to separate time series (high accuracy in signal recognition). It allows to process temporal spike signal.

The event camera is able to detect at least light in the visible light spectrum and in the near infrared spectrum, and to detect changes such as the target frequencies of the visual light communication emitter.

It is possible to proceed with the following steps.

Pixels are accumulated in order to sense an event (activated=positive versus deactivated=negative) over a time period greater than e.g. two times the period of the expected flashing frequency of the emitting light (the target frequency). For reliable communication, the time slice for accumulation should allow to accumulate preferably five to ten emitting periods.

For each accumulated pixel of the event camera, it is identified when a pixel is activated due to an appearing event (ON). It is also identified when the same pixel is de-activate by a disappearing event (OFF).

Since each event is timestamped, it is possible to compute the difference of time between event ON and OFF (or OFF to ON) of the same pixel (i.e. 1 flash). The inverse of this difference corresponds to the frequency of the change of state of the pixel.

Then, the number of times each frequency of flashing event appeared (histogram of frequencies) is computed. There should be a peak in the frequency corresponding to the different target frequencies. By identifying these peaks, it is possible to identify the emitting device by looking at a pre-stored map of allowed emitting devices and their related target frequencies.

Then, a localization on a 2D map (image) for each pixel of coordinate (x, y) is determined, the image area representing each target frequency. It allows to understand the direction of each of the emitting device. In this way, it is possible to reconstruct the image of the emitting areas.

For each detected emitting device, it is possible to search in the histogram of frequencies each pixel englobed near/inside the reconstructed device type emitting areas that emits at a given frequency. Then using visual light communication messaging methods, it is possible to decode the messages only emitted within a time frame of the flash of target frequency and/or only located in the messaging areas.

The message may comprise several information such as unique ID of emitter, speed of emitter, GPS coordinate of emitter, moving direction, and the length of segments of the lamp triangle 10t or large lamp triangle 100t formed by the three emitting portions or the three visual light communication emitters. This latter information is used to compute the distance between emitter and receiver. The remaining of the message is used during reconstruction below.

In the histogram of frequencies, it is possible to search the peaks corresponding to target frequency, and the predetermined difference between the target frequencies (f1, f2, f3). It is used to localize on the 2D image where are located the lamp triangle 10t or large lamp triangle 100t. Indeed it is possible to know the (x, y) coordinate of each pixel which has been emitted at target frequency plus the predetermined difference.

Then, it is possible to localize onto the 2D images by using the above-mentioned length of the segments of the lamp triangles 10t, 100t. To compute this distance, it is possible to use the Perspective 3 points method.

Once the distance is known, it is possible to reconstruct the received message. This is the end of the message decoding procedure.

This message is transmitted to a display unit that will inform the owner of visual light communication receiving device of potential warning and suggest actions to be taken.

Figure 5:
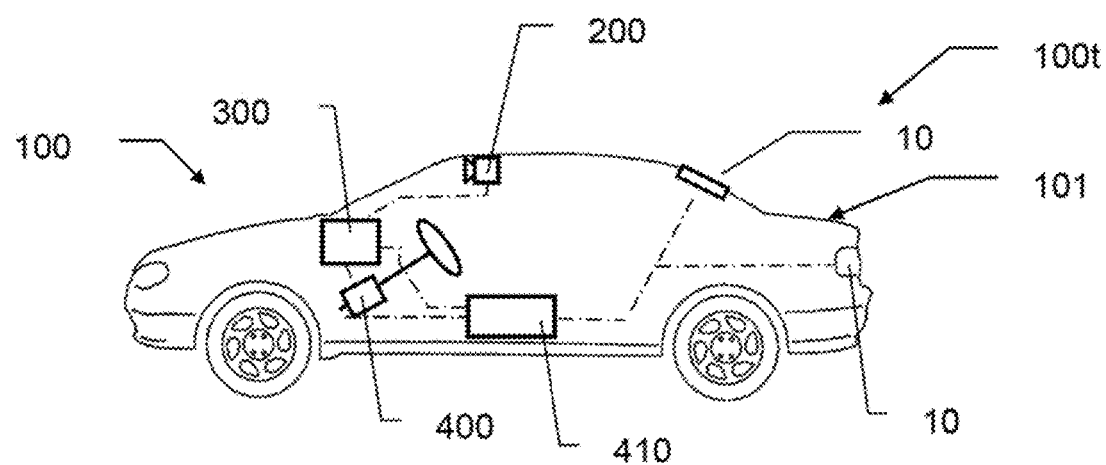
FIG. 5 represents a vehicle having the visual light communication emitter and the visual light communication receiver according to the embodiment.

FIG. 5 represents a vehicle 100 having visual light communication emitters 10 and the visual light communication receiver 200 according to the present invention.

The vehicle 100 is equipped with the visual light communication receiver 200 having preferably the event camera, in order to detect visual light communication emitter 10 from another vehicle or from a traffic light equipped with a visual light communication emitter (or any other device equipped with a visual light communication).

In a preferred embodiment, the vehicle 100 further comprises at least one visual light communication emitter 10, with the lamp triangle 10t presented above.

In another preferred embodiment, the vehicle 100 further comprises three visual light communication emitters 10 as presented above, the three visual light communication emitters 10 being positioned to form a large lamp triangle 100t in which two visual light communication emitters 10 positioned at the side of the tail lamps of the vehicle 100 (usually one on the left side, one on the right side), one visual light communication emitter 10 being placed on the top of the rear windows 101, at the side of the stop light. The large lamp triangle 100t allows to have detection of the distance between the visual light communication emitters 10 and the visual light communication receiver of another vehicle for example, so that the distance detection is more reliable. Indeed, the distance detection can be improved thanks to the cooperation of the distance detection on the lamp triangle 10t of each single visual light communication emitter 10, and/or the distance detection thanks to the large lamp triangle 100t.

In a preferred embodiment, the dimension of the large lamp triangle 100t can be emitted also by the third group of LEDs emitting at the target frequency f3.

The vehicle 100 further comprises a human-machine interface 300 such as a tactile screen (which could be the same as the information display unit of the visual light communication receiver 200 or a separate unit). The human-machine interface allows for the user of the vehicle (or during the manufacturing/repairing process of the vehicle) to record the information needed to the correct running to the system, such as a setting of the first target frequency f1, the second target frequency f2, the third target frequency f3, the dimension of the lamp triangle 10t, the dimension of the large lamp triangle 100t, the type of the vehicle, any other detection settings of the visual light communication receiver 200 or of any one of the visual light communication emitter 10, or any other data.

Further, the vehicle 100 comprises a control unit 410 to control the human-machine interface 300, the visual light communication receiver 200 and the visual light communication emitters 10, and a driver unit 400 of the vehicle 100. The driving unit 400 is arranged to drive the vehicle 100 is accordance with the information received by the visual light communication receiver 200, in particular for auto-piloted vehicle (such as unmanned vehicle) or semi auto-piloted vehicle having driving assistance functionalities. For example, in case of detection of an emergency situation, such as a very short distance separating two vehicles, it allows to slow down or stop the vehicle 100. It can be also an indication to change of way (drift) or stop by a police vehicle equipped with the visual light communication emitter, for which the driver unit 400 complies with the instruction from the police.

Figure 6:
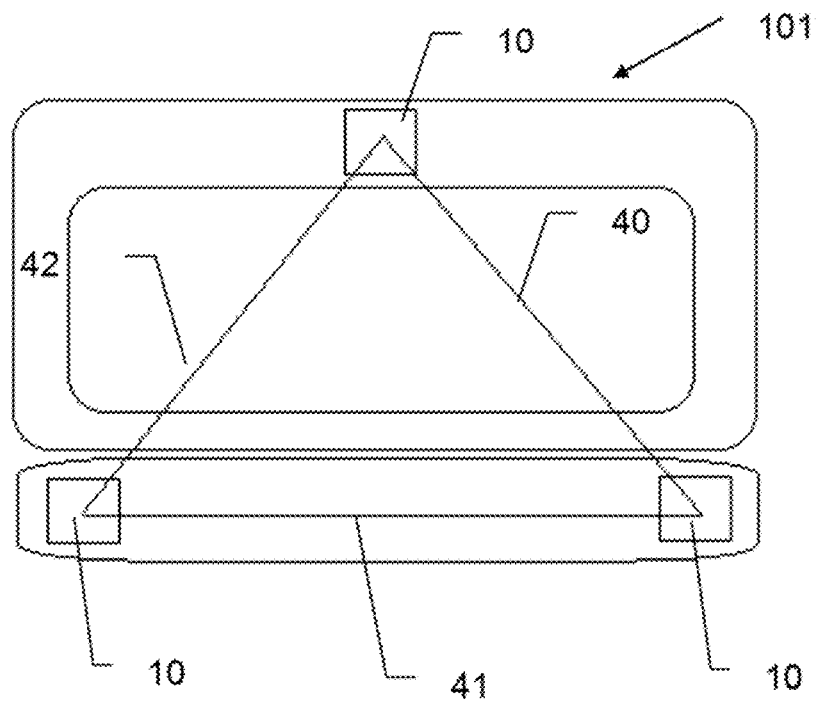
FIG. 6 represents a rear window of the vehicle having the visual light communication emitter and the visual light communication receiver according to the embodiment.

FIG. 6 represents a rear window 101 of the vehicle 100 having the visual light communication emitters 10.

As discussed above, the vehicle 100 is equipped with three visual light communication emitters 10, which are positioned so as to form the large lamp triangle 100t. Each visual light communication emitter 10 has also its own lamp triangle 10t. This allows to help the detection of the distance separating the visual light communication emitter 10 and the visual light communication receiver 200 of another vehicle. The large lamp triangle 100t is formed by the visual light communication emitters 10, and the dimension of the large lamp triangle 100t is the distance 42 between the left visual light communication emitter 10 installed on the left tail lamp to the visual light communication emitter 10 installed on the stop lamp on the rear window 101, the distance 40 between the right visual light communication emitter 10 installed on the right tail lamp to the visual light communication emitter 10 installed on the stop lamp on the rear window 101, the distance 41 between the right visual light communication emitter 10 installed on the right tail lamp to the left visual light communication emitter 10 installed on the left tail lamp. The large lamp triangle 100*t* may be an equilateral triangle or any type of triangle such as an isosceles triangle.

In a preferred embodiment, the visual light communication emitter 10 has a dimension of 30 cm×30 cm and the event camera of the visual light communication receiver 200 has a resolution (e.g. 1280×720) and optical lens sufficient (FOV of 25 degrees) for the above mentioned pattern of flashing LED to be sensed by the event camera, then the visual light communication range could be as great as 100 m.

The size of the 2D array of LED and the pattern make appearing a special pattern in the image. This pattern has enough pixel size to be detected and recognized at distances.

The issue of limited communication range due to loss of eye sight, can be tackled by transferring the message from mobile devices to mobile devices.

FIG. 7 represents vehicle according to the present invention in a street equipped with a traffic light having the visual light communication emitter and the visual light communication receiver according to the present invention.

It shows vehicles 100, 101 circulating in streets. The vehicles are equipped with the visual light communication emitters 10 as mentioned above.

In a preferred embodiment, the vehicles are equipped with visual light communication emitters 10 on the front of the vehicle so that they are able to communicate with facing vehicles, in addition to (or instead of) the fact that they are able to communicate with vehicle at their back.

Further, traffic light 1000 installed in the streets can be equipped with visual light communication emitter 10 in order to communicate information to the vehicle and/or visual light communication receiver 200. In particular, it relates to traffic information, general information (weather, news, financial information, advertising and the like), but also guiding direction and localization (e.g. emergency guidance to the hospital or the like).

It is also possible to choose a specific flashing frequency for each type of emitter (e.g. traffic lights between 1 kHz-1.5 kHz, emergency vehicle light between 2 kHz-2.5 kHz, car stopping light between 3 kHz-3.5 kHz, bus light or bus variable message signs between 4 kHz-4.5 kHz, bikes light between 5 kHz-5.5 kHz, neon lights of shops between 5 kHz-5.5 kHz, etc.). This allows to distinguish the emitting device whatever the color (wavelength) of its light. This mapping between flashing/target frequencies and type of light source can be used to search in the received data for the target emitting frequencies. It can also be used to identify the emitter and trigger some specific actions.

In this way, it is possible to ensure a reliable communication between different kind of lights and a single receiver. Furthermore, this decomposition of light source allowed frequency of flashing enables an easy identification of the emitting device which in turn can enhance the driving safety and the comfort of mobile receivers.

Light interference issue should also be reduced by combining the followings: the visual light communication receiver 200 that is using a 2D imager such as the event camera, for which the source of light coming from different angles will not overlap on the same image pixel, and the use of target frequencies different for each device. It is thereby unlikely that light emitted by two similar devices will be imaged on the same pixel of the event camera imager, which is the effective area for messaging.

Two scenarios of driving condition are explained below to further illustrate the advantages and the functionality, as way of examples.

Firstly, the vehicle/car 100 followed by a motor bike has just parked and the driver is about to open its door. The motorbike is also equipped with a visual light communication receiver having an event camera.

When driving normally the vehicle 100 emits its category which is a car, using the first target frequency f1, the location of the three points using the second target frequency f2, and the dimension of the lamp triangle 10*t*, and the driving direction e.g. straight (could be also e.g. straight, left, right, stopping, stopped, backing) using the third target frequency f3.

When the vehicle driver decides to park and activate its right blinker, information about direction is sent but direction is set to right.

Just before finishing the parking maneuver, the car emits the flash lights but the direction is set to stopping and include in the message the left side door may open but the driver is informed about the motorbike presence and will wait its passage before opening.

In this first scenario, the vehicle emits the light by combining multiple lights that were modified for light modulation. The modified lights are the tail lamps and the braking light which make the three points and allow communication with the target frequencies f1, f2, f3.

The motorbike that was following the parked vehicle can therefore be informed about the danger that a door may suddenly open but can be reinsured because the car will wait its passage. An information display unit then informs the motorbike driver by sound or display message about this danger and the distance and direction of the danger.

Usually this problem is tackled by using blind spot monitoring and informing the driver of an approaching motorbike and recommending the driver not to open its door. Although this method is effective, it relies on the ability of the blind spot monitor to detect the motorbike which is sometimes impossible due to sensor limitations. Informing the motorbike owner and telling him that he was detected and the car driver will safely wait his passage is a function that allows the motorbike driver to manage its own safety more efficiently.

If each mobile device is equipped with a visual light communication emitter located at its rear and a visual light communication receiver at its front at least, then it becomes possible to transmit such information from mobile device to mobile device such that an approaching motorbike visual light communication receiver not in direct eye sight contact with the car visual light communication emitter (which is about to open its door), can receive the warning information about door opening issue.

Alternatively, if the vehicles are equipped by visual light communication receiver and emitters looking at the front and the rear, then if one of the vehicle 100 (other than the car that is going to open its door) detects the motorbike, then this information can be transmitted up to the car that is going to open its door which will modify its message by acknowledging the presence of the motorbike and waiting its safe passage before opening the door.

The second scenario is explained here after. The scenario relates to an ambulance car coming in opposite direction of a car 100 equipped with a visual light communication receiver 200. In that case the lamp is the gyroscope lamp rotating at 1 Hz frequency. The gyroscope lamp is modified such that the visible side comprises the three different areas emitting at the target frequencies f1, f2 (with the three emitting points) and f3. It is also modified so that the not emitting side of the gyroscope lamp is modified by LED emitting the same information (as the blue light) by LED in the near infrared range. The ambulance car can thus indicate its driving direction and its speed using the third target frequency f3, the distance to the receiver can be computed by the receiver and based on the speed, distance and direction of the ambulance car, a message to give a way to the ambulance can be computed by the message information display unit of the visual light communication receiver.

It allows also vehicle to vehicle communication, for example when a traffic light is hidden by a truck and the truck communicate information such as the state of the traffic light to the vehicle behind. It allows also multi-user communication.

It is possible to adapt the visual light communication emitter to headlamps, tail lamps, turn light, brake and reverse lights of vehicle. It is also possible to use the color white or yellow for front lamp, the light emitters acting both as lamp for lighting and lamp for visual light communication with modulation of frequencies.

It is possible to equip the vehicle with an event camera looking at the back of the vehicle, to catch information emitted by a vehicle at the back.

It is also possible to equip the vehicle light communication emitter with dirt sensor or proximity sensor, so as to switch the communication from one emitter to another, when dirt is detected or proximity is detected (and the message can thereby not be transmitted correctly). It is also possible to activate a wiper of the visual light communication emitter when dirt is detected or when another vehicle inform that the message is not clearly emitted.

It is also possible to emit authentication data, such as an insurance number, during a police control, with a vehicle positioned around the vehicle, or a front or back. In particular, if the visual light communication emitter is a turn light, it is possible to communicate not only front and back, but also around the vehicle.

According to the embodiment, a visual light communication emitter and a visual light communication receiver with high reliability, high capacity and which allow to increase the safety while being simpler are achievable.

According to the embodiment, a visual light communication emitter (10) for a vehicle, arranged to communicate a status of the vehicle, includes a first light emitter (11-13) arranged to emit flash light which is modulated at a first target frequency in a dedicated non-visible spectrum, and a second light emitter (21-23) arranged to emit flash light which is modulated at a second target frequency in the dedicated non-visible spectrum. A difference between the first target frequency and the second target frequency is predetermined, so as to authenticate the status of the vehicle.

The visual light communication emitter according to the embodiment allows to transfer information with very high data rate (~10-100 Mbits/s) in particular for short range. It allows also to have high data rate (~1 Mbits/s) for long range, even in presence of noise in the area. Further, such high bandwidth allows very low latency communication which is suitable for vehicle to vehicle communication and the related safety critical applications such as lane change warning, emergency breaking etc. The visual light communications are not affected by electromagnetic noise which is not the case of radio frequency communication. It allows communication when radio frequency communication is not available (e.g. in tunnels, mountain areas, skyscrapers), or not allowed (e.g. in hospitals). The visual light communication is not causing arm to human health which is not the case for radio frequency communication. Further, it is less subject to data transmission security (hacking) issues because light transmission is very fast (difficult to intercept) and can only be intercepted if light emitter is in direct line of sight which is not the case for radio frequency communication. Still further, the visual light communication emitter according to the present invention could be used for identification purposes and authentication, as this is not possible that a noise has the same difference between frequencies and in the same range, with the same signal. It is thereby possible to acknowledge that the signal comes from a vehicle equipped with such visual light communication emitter for vehicle.

Still further, it allows to adapt existing lamp, tail lamp or stop lamp of vehicle, so as to ease implementation.

It allows to increase the distance of communication of the visual light communication. This allows to increase the reliability of the visual light as there is no natural event in said range of frequency.

The first target frequency and the second target frequency are between 1 kHz and 1 MHz.

This allows to increase the reliability of the visual light as there is no natural event in said range of frequency.

Advantageously, the first target frequency and the second target frequency are in the long radio waves spectrum.

This allows to increase the reliability as there is only few utilisation in said range (from 30 kHz to 300 kHz, or low radio frequency).

The difference between the first target frequency and the second target frequency is selected in the range of 0.01 kHz to 1 kHz, preferably 0.1 kHz to 0.5 kHz.

This allows to increase the reliability of the visual light communication as there is no natural event having such difference of target frequencies in said range.

Alternatively, the target frequencies are in the human sound waves spectrum (for a human around <15 kHz).

Alternatively, the target frequencies are in the animal sound waves spectrum (<30 kHz).

Alternatively, the target frequencies are in the medium radio frequency spectrum (from 300 kHz to 3 MHz).

Alternatively, the target frequencies are in the high radio frequency spectrum (from 3 MHz to 30 MHz).

Alternatively, the target frequencies are in the very high radio frequency spectrum (from 30 MHz a 300 MHz).

Alternatively, the target frequencies are selected in the range of 1 kHz to 10 kHz, preferably 1 kHz to 3 kHz.

Alternatively, the target frequencies are selected in the range of 10 kHz to 100 kHz, preferably 10 kHz to 20 kHz.

Alternatively, the target frequencies are selected in the range of 100 kHz to 1000 kHz, preferably 100 kHz to 200 kHz.

Alternatively, the target frequencies are selected in the range of 1000 kHz to 10000 kHz, preferably 1000 kHz to 2000 kHz.

Alternatively, the target frequencies are selected in the range of 10000 kHz to 100000 kHz, preferably 10000 kHz to 20000 kHz.

It allows to switch and select the good target frequency range according to the environmental condition, in particular if one range, which has been preselected is crowdy or saturated, or to operate in downgraded mode.

Advantageously, the visual light communication emitter has a third light emitter arranged to emit flash light which is modulated at a third target frequency in the non-visible spectrum, different from the first target frequency and the second target frequency.

This allows to increase the reliability and to increase the capacity of the visual light communication, while increasing the safety.

The second light emitter (21-23) includes three emitting portions distant from each other by predetermined distances so as to form a lamp triangle (10t) having a predetermined dimension. The visual light communication emitter is arranged to emit flash light so as to communicate the predetermined dimension of the lamp triangle.

Advantageously, the first light emitter is arranged to emit flash light so as to communicate properties of a device on which the visual light communication is installed, and the second light emitter is arranged to emit flash light so as to communicate the predetermined dimension of the lamp triangle, and the third light emitter is arranged to emit flash light so as to communicate data.

Advantageously, the third light emitter is arranged at least partially inside the lamp triangle.

Advantageously, the third light emitter is arranged to emit flash light so as to communicate data comprising a unique identification of the visual light communication emitter or a speed of the vehicle or a moving direction of the vehicle or a localization of the vehicle.

This allows to increase the reliability of the visual light communication emitter.

The first light emitter (11-13) is arranged to emit red stop light when installed in the vehicle. The second light emitter (21-23) is arranged to emit red position light when installed in the vehicle.

This allows to adapt the visual light communication emitter to any kind or model of vehicle lamp, such as a tail lamp.

The visual light communication emitter further includes a third light emitter (30) arranged to emit flash light which is modulated at a third target frequency in the dedicated non-visible spectrum, and which is different from the first target frequency and the second target frequency. The third light emitter is arranged at least partially inside the lamp triangle.

The visual light communication emitter (10) is arranged to emit flash light so as to communicate data including a unique identification of the visual light communication emitter (10) or a speed of the vehicle or a moving direction of the vehicle or a localization of the vehicle.

The visual light communication emitter further includes a dirt sensor or a proximity sensor.

It allows to check if the visual light communication is dirt or if its outside surface is dirt, or if there is an obstacle in front of the visual light communication emitter. This allows also to switch the communication from one visual light communication emitter to another.

The visual light communication emitter further includes a wiper.

This allows to clean the visual light communication emitter if it is dirt or if it is detected that the visual light communication emitter is not accurately transmitting the communication, for example with a feedback loop from another vehicle, communicating that the other vehicle cannot accurately detect the communication.

A visual light communication receiver (200) includes an event camera arranged to detect flash light, and a control unit arranged to recognize the predetermined difference between the first target frequency and the second target frequency.

Advantageously, the control unit is arranged to detect any frequency difference between the target frequencies.

This allows to propose a receiver able to cooperate with the visual light communication emitter according to the first aspect, so as to propose a reliable communication device.

The visual light communication receiver (200) includes a detection module arranged to detect the lamp triangle (10t) of the visual light communication emitter (10) and calculate a distance between the visual light communication receiver (200) and the visual light communication emitter (10) based on the predetermined dimension of the lamp triangle (10t).

It allows to calculate the distance and to inform the user about such distance, in particular for safety issue.

A vehicle (100) includes the visual light communication emitter (10) and/or the visual light communication receiver (200), and a vehicle control unit.

It allows to propose a vehicle equipped with reliable visual communication devices, in particular for increasing the safety.

Advantageously, the vehicle comprises the visual light communication receiver according to the second aspect and an interface arranged to communicate with a user of the vehicle or an autopilot device of the vehicle.

It allows to propose a vehicle with an interface to communicate with a user or to the autopilot.

The vehicle includes at least two visual light communication emitters (10) each including a dirt sensor or a proximity sensor. The vehicle control unit is arranged to switch communication from one visual light communication emitter (10) to the other visual light communication (10) if a dirt or a proximity is detected.

It allows to increase the quality of communication of the visual light communication emitter in real situation of the vehicle path, with other vehicles in particular.

The vehicle further includes at least three visual light communication emitters (10) being arranged so as to form a large lamp triangle, and the visual light communication receiver. The vehicle control unit is arranged to detect if one visual light communication emitter (10) is masked by an obstacle in a vehicle path and to switch communication from the visual light communication emitter (10) being masked to another one of the visual light communication emitters (10).

It allows to increase the quality of communication is real situation of the vehicle path, in particular with other vehicles.

An information device (1000) fixed in a vehicle path, includes the visual light communication emitter (10) and arranged to communicate data comprising traffic data of the vehicle path, emergency data, localization, best trajectory or best way to a specific location.

The information device could be a traffic light and is securely placed or fastened, so as to be stationary.

It allows to propose a device with a reliable visual light communication, which can be fixed or mobile.

It allows to communicate many types of information and/or data.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. Visual light communication emitter for a vehicle, arranged to communicate a status of the vehicle, and comprising:
   a first light emitter arranged to emit flash light which is modulated at a first target frequency in a dedicated non-visible spectrum,
   a second light emitter arranged to emit flash light which is modulated at a second target frequency in the dedicated non-visible spectrum, and
   wherein a difference between the first target frequency and the second target frequency is predetermined, so as to authenticate the status of the vehicle,
   wherein the first target frequency and the second target frequency are between 1 kHz and 1 MHz.

2. Visual light communication emitter according to claim 1, wherein the difference between the first target frequency and the second target frequency is selected in the range of 0.01 kHz to 1 kHz, preferably 0.1 kHz to 0.5 kHz.

3. Visual light communication emitter according to claim 1, wherein:
   the second light emitter comprises three emitting portions distant from each other by predetermined distances so as to form a lamp triangle having a predetermined dimension, and
   wherein the visual light communication emitter is arranged to emit flash light so as to communicate the predetermined dimension of the lamp triangle.

4. Visual light communication emitter according to claim 3, further comprising a third light emitter arranged to emit flash light which is modulated at a third target frequency in the dedicated non-visible spectrum, and which is different from the first target frequency and the second target frequency, and wherein the third light emitter is arranged at least partially inside the lamp triangle.

5. Visual light communication emitter according to claim 1, wherein
   the first light emitter is arranged to emit red light as a stop light when installed in the vehicle, and
   the second light emitter is arranged to emit red light at a different position from the first light emitter when installed in the vehicle.

6. Visual light communication emitter according to claim 1, wherein the visual light communication emitter is arranged to emit flash light so as to communicate data comprising a unique identification of the visual light communication emitter or a speed of the vehicle or a moving direction of the vehicle or a localization of the vehicle.

7. Visual light communication emitter according to claim 1, further comprising a dirt sensor or a proximity sensor.

8. Visual light communication emitter according to claim 1, further comprising a wiper.

9. Visual light communication emitter and receiver system comprising:
   a vehicle communication emitter comprising:
      a first light emitter arranged to emit flash light which is modulated at a first target frequency in a dedicated non-visible spectrum,
      a second light emitter arranged to emit flash light which is modulated at a second target frequency in the dedicated non-visible spectrum, and
      wherein a difference between the first target frequency and the second target frequency is a predetermined difference, so as to authenticate the status of the vehicle;
   a communication receiver comprising:
      an event camera configured to detect flash light from a first light emitter and a second light emitter,
      a control unit configured to search frequencies received by the even camera including the first target frequency emitted from the first light emitter and the second target frequency emitted from the second light emitter to determine the predetermined difference between the first target frequency and the second target frequency based on peaks in the received frequencies to authenticate the status of the a vehicle.

10. Visual light communication emitter and receiver system according to claim 9, further comprising a detection module arranged to
   detect the lamp triangle of a visual light communication emitter for a vehicle, the visual light communication emitter arranged to communicate a status of the vehicle,
      wherein the second light emitter comprises three emitting portions distant from each other by predetermined distances so as to form a lamp triangle having a predetermined dimension, and
      wherein the visual light communication emitter is arranged to emit flash light so as to communicate the predetermined dimension of the lamp triangle,
   calculate a distance between the visual light communication receiver and the visual light communication emitter based on the predetermined dimension of the lamp triangle.

11. Vehicle comprising one of a visual light communication emitter and a visual light communication receiver, and a vehicle control unit,
   the visual light communication emitter being arranged to communicate a status of the vehicle and comprising:
      a first light emitter arranged to emit flash light which is modulated at a first target frequency in a dedicated non-visible spectrum;
      a second light emitter arranged to emit flash light which is modulated at a second target frequency in the dedicated non-visible spectrum, and
      wherein a difference between the first target frequency and the second target frequency is predetermined, so as to authenticate the status of the vehicle,
   the visual light communication receiver comprising an event camera arranged to detect flash light, and a control unit arranged to recognize the predetermined difference between the first target frequency and the second target frequency based on peaks in received frequencies of the event camera.

12. Vehicle according to claim 11, comprising:
   at least two visual light communication emitters each including a dirt sensor or a proximity sensor,
   wherein the vehicle control unit is arranged to switch communication from one visual light communication emitter to the other visual light communication if a dirt or a proximity is detected.

13. Vehicle according to claim 11, further comprising:
   at least three visual light communication emitters being arranged so as to form a large lamp triangle,
   the visual light communication receiver, and
   wherein the vehicle control unit is arranged:

to detect if one visual light communication emitter is masked by an obstacle in a vehicle path, to switch communication from the visual light communication emitter being masked to another one of the visual light communication emitters.

\* \* \* \* \*